(No Model.)
G. E. BLAKE.
VEHICLE WHEEL RIM.
No. 551,713. Patented Dec. 17, 1895.
Fig. 1.
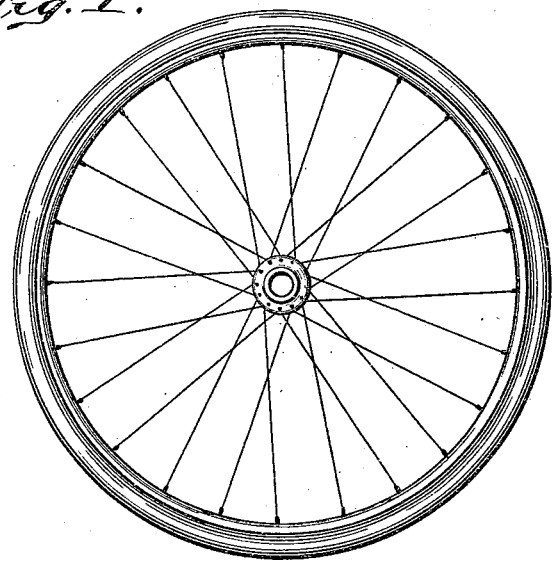
Fig. 2.
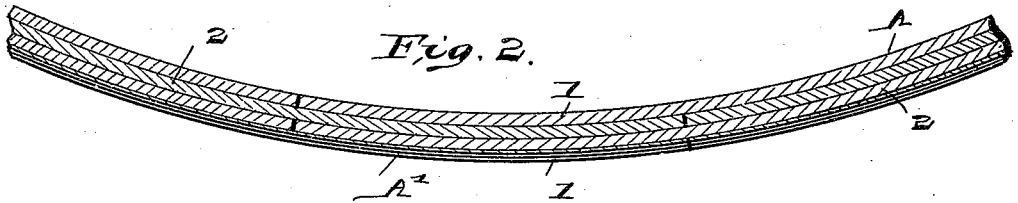
Fig. 3. Fig. 4.
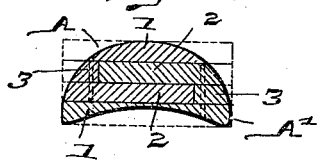 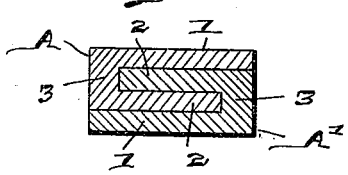
Fig. 5.
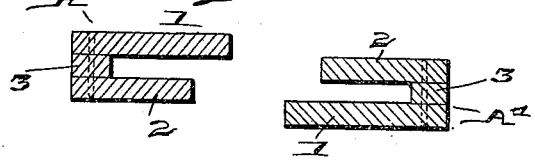
WITNESSES: INVENTOR
H. D. Nealy. George E. Blake,
J. A. Walsh. BY Chester Bradford.
ATTORNEY.

UNITED STATES PATENT OFFICE.

GEORGE E. BLAKE, OF GREENCASTLE, INDIANA.

VEHICLE-WHEEL RIM.

SPECIFICATION forming part of Letters Patent No. 551,713, dated December 17, 1895.

Application filed October 7, 1895. Serial No. 564,932. (No model.)

*To all whom it may concern:*

Be it known that I, GEORGE E. BLAKE, a citizen of the United States, residing at Greencastle, in the county of Putnam and State of Indiana, have invented certain new and useful Improvements in Vehicle-Wheel Rims, of which the following is a specification.

The object of my said invention is to produce an improved laminated rim for wheels for vehicles, especially those used on bicycles.

Said invention consists in a peculiar formation of the layers of which the rim is composed, as will be hereinafter more particularly described and claimed.

Referring to the accompanying drawings, which are made a part hereof and on which similar letters and numerals of reference indicate similar parts, Figure 1 is a side elevation of a vehicle-wheel, such as is suitable to embody my said invention; Fig. 2, a fragmentary longitudinal sectional view of the rim on an enlarged scale; Fig. 3, a transverse sectional view of the rim; Fig. 4, a transverse sectional view of the rim in the rough before being given its curved cross-sectional formation, and Fig. 5 a similar view of the parts of said rim somewhat separated from each other.

Said rim consists of two principal parts A A', and each of these parts has two flat portions 1 and 2 separated by a narrow strip 3. As shown, the portions 1 are of the same width as the complete rim, and the portions 2 are as much narrower than the portions 1 as the width of the portions 3—that is to say, the portions 2 and 3 together are equal in width to the portions 1. These parts A and A' may be formed of single pieces of wood, as indicated in the cross-sectional view, Fig. 4, or they may be built up of three strips of wood before being placed together, as indicated in the cross-sectional views, Figs. 3 and 5, in which case said three members should, besides being glued, be also united by small tough wire nails or brads, although this is not essential to my invention. When formed as shown in Fig. 4, the fiber of the wood of course constitutes the union. In assembling said parts they should be arranged, as shown most plainly in Fig. 2, with the ends breaking joints, and it is manifest, when so united with the layers overlapping each other, that a wheel-rim constituted therefrom is a firm and strong structure. When formed as shown in Fig. 4, the grains of the members 1 and 2 of the part A run alike and in one direction, and the members 1 and 2 of the part A' run alike, but in a different direction. When fully assembled these parts should be glued and pressed firmly together and given the required formation for the service they are to perform, as shown and as will be readily understood.

Having thus fully described my said invention, what I claim as new, and desire to secure by Letters Patent, is—

A rim for a vehicle wheel composed of two parts each having two members separated at one side and connected at the other side and adapted to interlock with each other to form said wheel rim, substantially as shown and described.

In witness whereof I have hereunto set my hand and seal, at Greencastle, Indiana, this 3d day of October, A. D. 1895.

GEORGE E. BLAKE. [L. S.]

Witnesses:
    G. F. WILLIAMSON,
    J. B. TUCKER.